United States Patent
Biles et al.

(10) Patent No.: US 6,612,533 B2
(45) Date of Patent: Sep. 2, 2003

(54) ADJUSTABLE SUPPORT

(75) Inventors: Brian Biles, Elkhart Lake, WI (US); Peter Fellenz, Kewaskum, WI (US)

(73) Assignee: Cabinet-Eaz L.L.C., Elkhart Lake, WI (US)

( * ) Notice: Subject to any disclaimer, the term of this patent is extended or adjusted under 35 U.S.C. 154(b) by 0 days.

(21) Appl. No.: 09/900,645

(22) Filed: Jul. 9, 2001

(65) Prior Publication Data

US 2003/0006354 A1 Jan. 9, 2003

(51) Int. Cl.⁷ ................................................ F16M 11/26
(52) U.S. Cl. ................ 248/354.1; 248/125.2; 248/125.1; 248/125.3; 248/125.8
(58) Field of Search .................... 248/125.2, 125.1, 248/125.3, 125.8, 354.1, 354.4, 354.5, 185.1; 312/245; 254/133 A, 133 R, 100

(56) References Cited

U.S. PATENT DOCUMENTS

| | | | |
|---|---|---|---|
| 942,592 A | * 12/1909 | Schneider | .................... 52/150 |
| 1,381,663 A | * 6/1921 | Roeder | .................... 211/86.01 |
| 1,382,505 A | * 6/1921 | Hargey | .................... 211/86.01 |
| 2,502,667 A | * 4/1950 | Pagett | .................... 248/161 |
| 3,313,505 A | * 4/1967 | Patrie | .................... 211/191 |
| 3,737,134 A | 6/1973 | Foon | |
| 4,221,362 A | 9/1980 | Van Santen | |
| D263,114 S | 2/1982 | Sette | |
| 4,581,863 A | 4/1986 | Thaler | |
| 4,756,642 A | * 7/1988 | Quinn et al. | .................... 114/44 |
| 5,169,219 A | * 12/1992 | Obbink | .................... 248/354.3 |
| D338,310 S | 8/1993 | Clarke | |
| 5,257,764 A | * 11/1993 | Spaulding | .................... 248/125.1 |
| 5,297,779 A | * 3/1994 | Collins et al. | .................... 254/98 |
| 5,400,994 A | 3/1995 | Shawwaf et al. | |
| 5,513,825 A | * 5/1996 | Gutgsell | .................... 108/147 |
| 5,516,069 A | * 5/1996 | Hanna | .................... 248/354.1 |
| 5,527,016 A | * 6/1996 | Wilkerson, Jr. | .................... 182/113 |
| 5,826,847 A | 10/1998 | Warner et al. | |
| 5,906,284 A | * 5/1999 | Hammerstrom et al. | .... 211/107 |
| 5,979,854 A | 11/1999 | Lundgren et al. | |
| 6,290,192 B1 | * 9/2001 | Messerli | .................... 248/188.5 |
| 6,347,489 B1 | * 2/2002 | Marshall et al. | .......... 248/354.5 |
| 6,349,512 B1 | * 2/2002 | Berkey et al. | .............. 52/126.6 |

\* cited by examiner

Primary Examiner—Leslie A. Braun
Assistant Examiner—Ingrid Weinhold
(74) Attorney, Agent, or Firm—Donald Cayen

(57) ABSTRACT

An adjustable support is useful to carpenters for installing cabinets and handrails in buildings. The adjustable support comprises a stand that defines a longitudinal axis. An adjuster is threaded into the stand. A carrier rests on the adjuster. The stand provides coarse adjustment, and the adjuster provides fine adjustment, of the carrier. In one embodiment, the carrier is a flat plate that supports a cabinet. A tray secured to the stand stores tools used to install the cabinet. In another embodiment, the carrier includes a cradle that is pivotable to match the angle of a handrail along a stairway wall. The cradle may be offset from the stand longitudinal axis. Alternately, the stand has a working edge that is spaced relative to the cradle such that placing the stand working edge against the stairway automatically positions the cradle at the proper spacing from the wall.

13 Claims, 4 Drawing Sheets

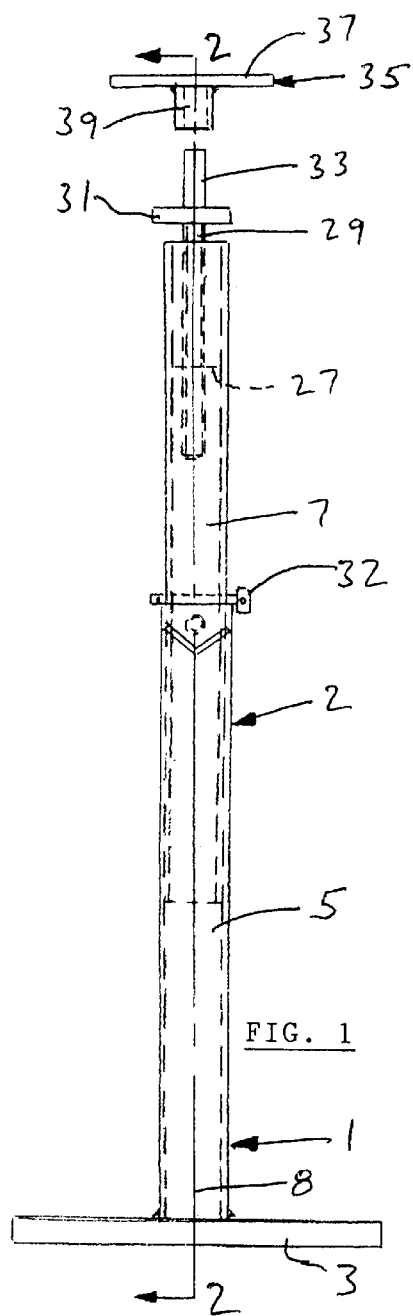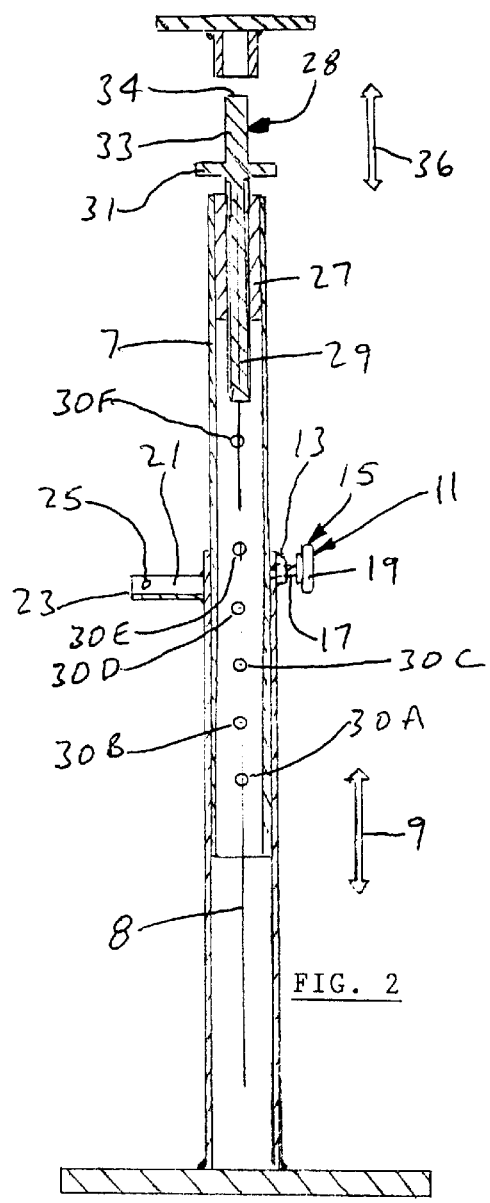

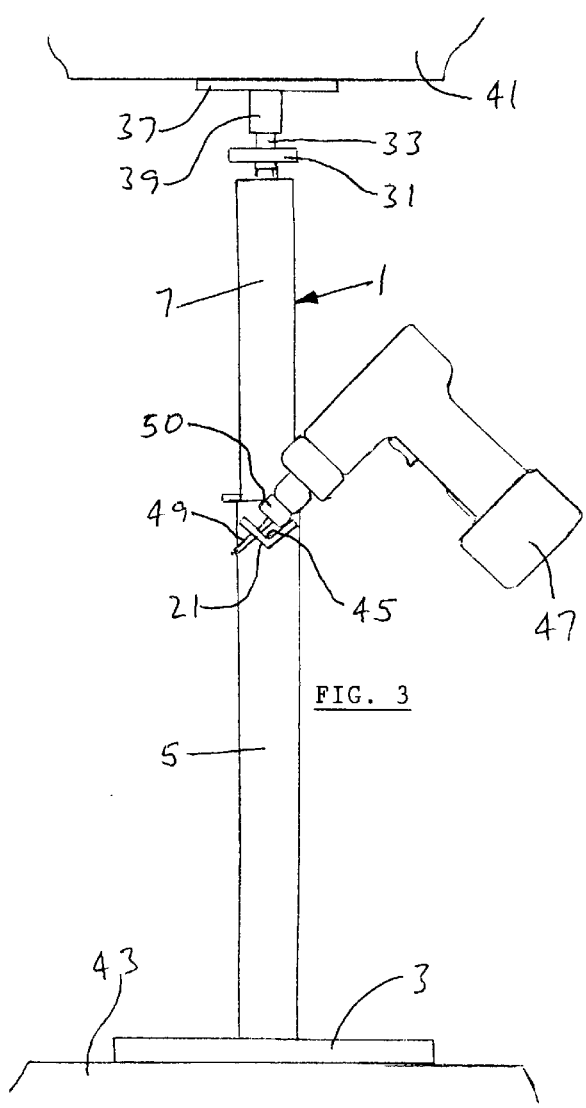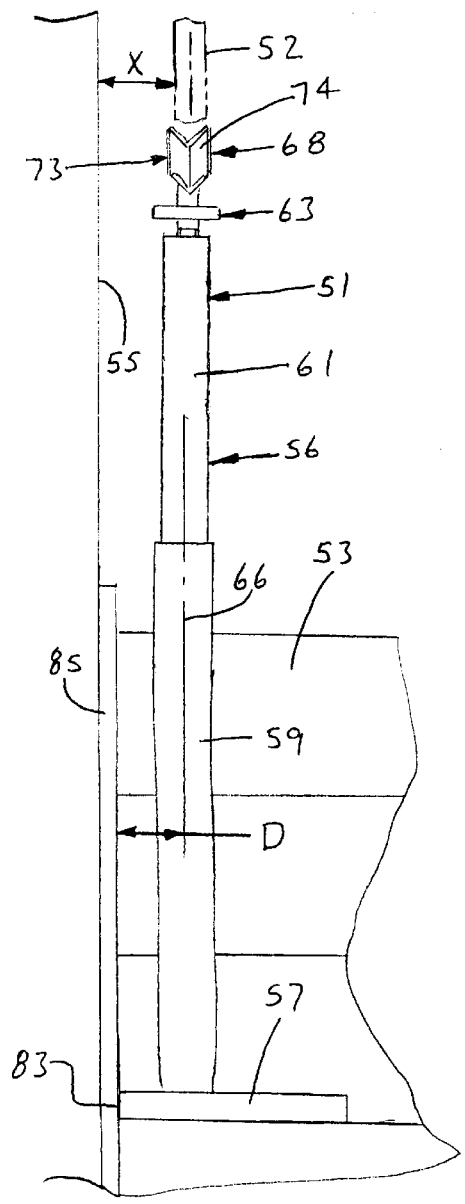

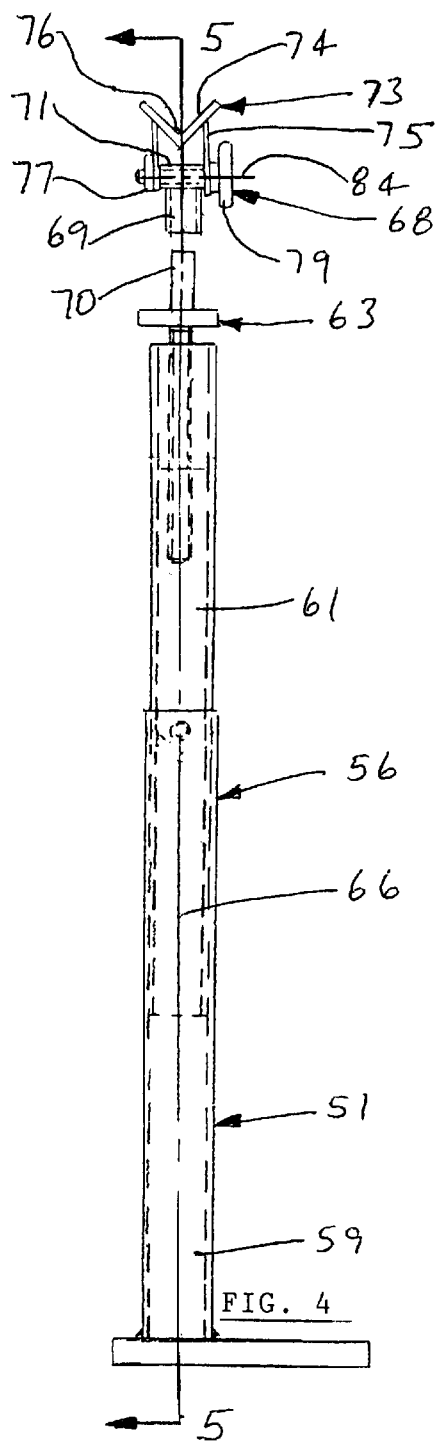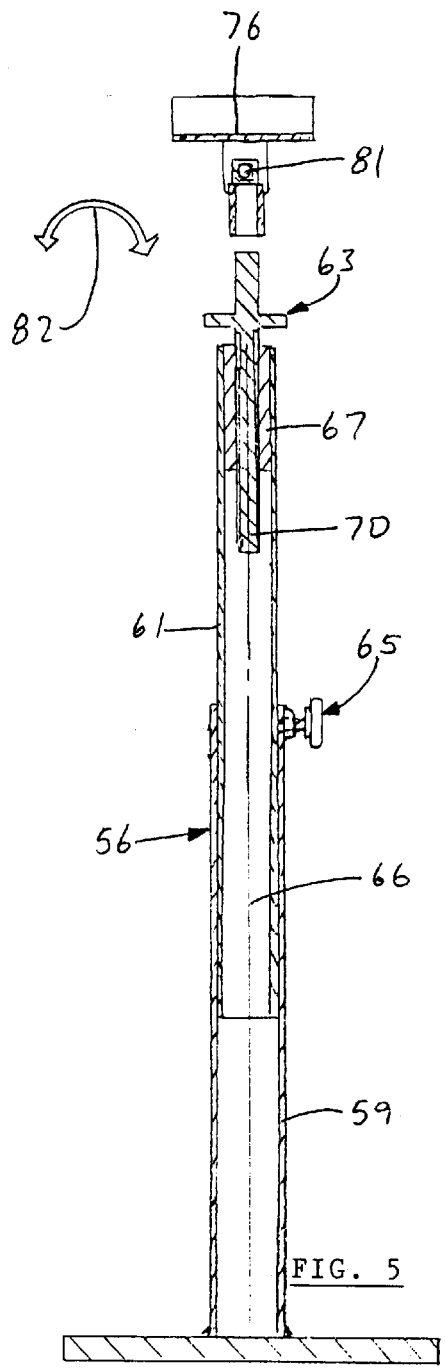

ADJUSTABLE SUPPORT

BACKGROUND OF THE INVENTION

1. Field of the Invention

This invention pertains to construction equipment, and more particularly to apparatus that assists construction workers install building components.

2. Description of the Prior Art

Various equipment has been developed to lift heavy objects and to temporarily hold them in place. For example, automotive jacks of different designs and capacities are well known and in widespread use. For example, U.S. Pat. No. Des. 216,144 shows a typical prior jack that holds an object at a considerable height above a support surface. U.S. Pat. No. 3,995,565 discloses a jack-type cargo brace.

Telescoping supports are also well known. In many telescoping designs, relatively slidable columns are held in place by pins or similar elements. U.S. Pat. Nos. 5,201,488; 5,622,355; and 5,979,854 show examples of that kind of telescoping support. In other telescoping supports, relatively slidable columns are held in place by a clamping or friction device. U.S. Pat. Nos. 3,930,645; 4,083,530; 4,757,975; and 6,042,066 show representative telescoping support devices that use clamps or friction devices.

Another variation of columnar adjustable supports employs threaded members. Turning one of the members causes it to move linearly and adjust the distance between a support surface and a supported object. Typical thread-type supports may be seen in U.S. Pat. No. Des. 263,114; Des. 338,310; 3,737,134; 3,917,208; 3,920,220; 4,221,362; 4,581,863; 5,400,994; and 5,826,847.

The lifting and support devices described in the foregoing patents work well for their intended purposes. Nevertheless, they do have certain disadvantages. For example, the telescoping support column of the U.S. Pat. No. 3,737,134 requires a separate rod in order to use it. The jack post of the U.S. Pat. No. 4,221,362 requires a separate wrench to perform the length adjustments.

Thus, there is a need for further developments to adjustable supports.

SUMMARY OF THE INVENTION

In accordance with the present invention, an adjustable support is provided that greatly assists carpenters and other craftsmen to install bulky and heavy components in buildings. This is accomplished by apparatus that includes a carrier that is conveniently adjustable relative to a stand.

The stand includes a base and a lower post upstanding from the base. An upper post is slidable within the lower post along a stand longitudinal axis. The two posts are lockable to each other at desired locations relative to each other.

In the preferred embodiment, a threaded insert is fixed to the interior of the upper post at its top end. An adjuster has a threaded rod that mates with the insert threads. A disc on the adjuster is between the threaded rod and a short shaft that has a free end. The disc has an outer diameter considerably larger than the diameters of the threaded rod and the shaft.

According to one aspect of the invention, the carrier is a flat plate with a pipe fastened to the plate. The carrier pipe is sized to fit over the adjuster shaft, such that the carrier plate is generally perpendicular to the stand longitudinal axis and rests on the adjuster shaft free end. Turning the disc moves the adjuster and the carrier along the stand longitudinal axis.

In use, the base of the stand is placed on a support surface under the final installed location of the object such as a kitchen cabinet. The upper post is slid in the lower post to bring the carrier plate close to the final installed location of the cabinet. The stand is then locked. The cabinet is placed on the carrier plate. The adjuster disc is turned as required to raise or lower the cabinet to the desired final location. The relatively small area of the adjuster shaft free end produces only a small frictional torque on the carrier plate when the adjuster is turned. Consequently, there is little, if any, tendency for the cabinet to turn about the stand longitudinal axis with the adjuster shaft as the cabinet is brought into its final location. With the cabinet supported in place by the adjustable support, it can be permanently installed or otherwise worked on without concern for its moving from its desired location.

In the preferred embodiment, the upper post has a series of cross holes through it. The cross holes are spaced at predetermined intervals that correspond to the height of the lower post and to the height of the cabinet above the support surface. A pin is removeably inserted through a selected cross hole such that when the pin rests on the top of the lower post, the carrier plate is nominally at the distance of the bottom of the cabinet above the support surface. The cross holes and pin thus function to both quickly locate the carrier at approximately its correct position and also to provide a positive stop against the upper post sliding further into the lower post.

It is a feature of the invention that it temporarily stores selected tools associated with installing the cabinet. For that purpose, a tray is secured to the lower post. Small tools such as drill bits and screws can be stored in the tray. A hole in the tray is so dimensioned and located that when it receives a drill bit chucked in a conventional electric hand drill, the drill chuck rests on the tray. In that manner, the carpenter has the drill close at hand when he installs the cabinet.

Further in accordance with the present invention, the adjustable support is easily convertible to use for installing stairway handrails. In that case, a carrier having a pivotable cradle is used. The cradle has a trough to which are joined a pair of lugs. The trough has an apex that defines a plane that contains the stand longitudinal axis. The lugs straddle a cross tube on a pipe. A clamp provides a pivotal connection between the cradle lugs and the cross tube. The clamp enables the cradle to pivot about a centerline that is perpendicular to the stand longitudinal axis. The clamp also clamps the lugs against the cross tube at an angle relative to the stand longitudinal axis that matches the angle of the handrail relative to the stairway.

To meet regulatory codes, handrails must be located at a specific spacing from a wall. To assist supporting the handrails at the required spacing, the adjustable support base is constructed with a working edge that is at a specific distance from the stand longitudinal axis. Placing the base working edge against a toe plate of the stairway automatically locates the cradle trough at the proper spacing from the wall of the stairway.

In a modified embodiment of the invention, an adjustable support for installing handrails uses the same stand that is used for installing cabinets, but the carrier is offset from the stand longitudinal axis. The amount of the offset suits the distance between a working edge of the stand base and the stand longitudinal axis. The offset cradle is pivotable and clampable in generally the same manner as the non-offset cradle.

The method and apparatus of the invention, using a combination of adjustable components, thus greatly aids the installation of bulky objects in buildings. The probability of mis-positioning an object is remote, even though the object is too heavy for an unaided person to handle effectively.

Other advantages, benefits, and features of the present invention will become apparent to those skilled in the art upon reading the detailed description of the invention.

BRIEF DESCRIPTION OF THE DRAWINGS

FIG. 1 is a side view of the present invention in a partially disassembled condition.

FIG. 2 is a cross-sectional view taken along line 2—2 of FIG. 1.

FIG. 3 is a side view of the invention in use.

FIG. 4 is a front view of a modified adjustable stand according to the present invention in a partially disassembled condition.

FIG. 5 is a cross-sectional view taken along line 5—5 of FIG. 4.

FIG. 6 is a front view of the adjustable support of FIGS. 4 and 5 showing it in use.

DETAILED DESCRIPTION OF THE INVENTION

Figure 7:
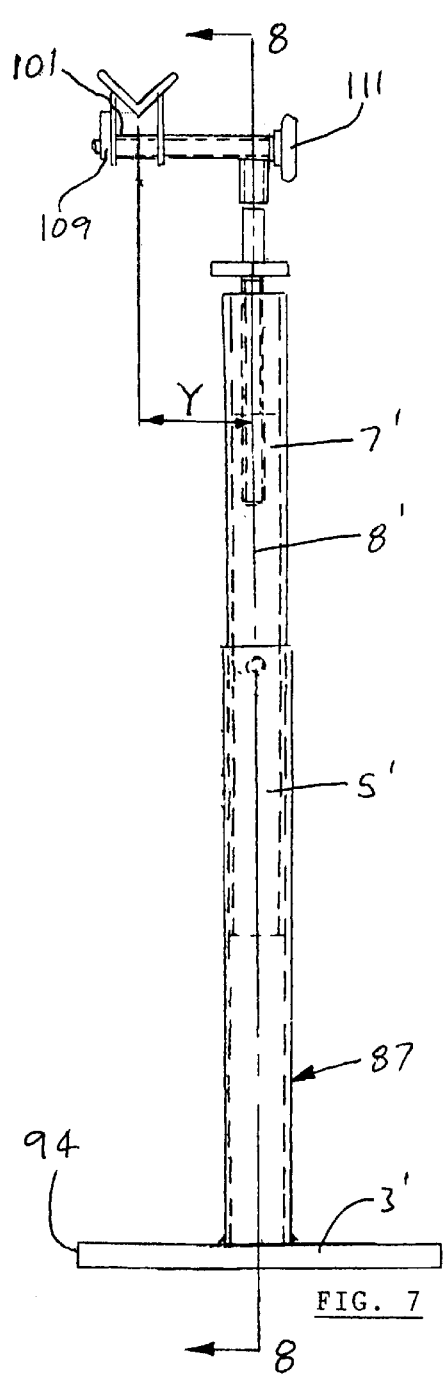
FIG. 7 is a front view of a further modified adjustable support according to the present invention in a partially disassembled condition.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1 and 2, an adjustable support 1 is illustrated that includes the present invention. The adjustable support 1 is particularly useful to carpenters when installing cabinets and cupboards in homes. However, it will be understood that the invention is not limited to building trade applications.

The adjustable support 1 is comprised of a stand 2 having a base 3, a lower post 5, and an upper post 7. Preferably, both posts 5 and 7 are square steel tubes. The posts define a stand longitudinal axis 8. The bottom end of the lower post is welded to the base 3. The upper post is slidable in the directions of arrows 9 inside the lower post along the longitudinal axis 8.

In the top end of the upper post 7 is a threaded insert 27. The threaded insert 27 may be a rectangular block of steel welded to the upper post interior. The upper post has a number of cross holes 30A, 30B, 30C, 30D, 30E, and 30F through it. A pin 32, which may be a hitch pin, is insertable through any of the cross holes 30A–30F. The upper post is slidable into the lower post 5 until the pin 32 rests on the top end of the lower post.

The upper post 7 is lockable to the lower post 5 at any selected position relative thereto by a lock 11. As illustrated, the lock 11 is in the form of a nut 13 fixed, as by welding, to the lower post. A hand lock 15 has a stud 17 that threads into the nut 13. One end of the stud 17 protrudes through a hole in the lower post and is contactable against the upper post. The other end of the stud 17 has a hand knob 19. By turning the hand knob 19, the stud locks or releases the upper post relative to the lower post.

One end of a tray 21 is secured to the lower post 5 near its top end. In the preferred embodiment, the tray 21 is an angle iron with its legs arranged symmetrically about a vertical plane. In one of the tray legs, near the tray free end 23, is a hole 25.

An adjuster 28 has a threaded rod 29 that mates with the threaded insert 27 in the upper post 7. The adjuster 28 also includes a disc 31 and a shaft 33 concentric and integral with the threaded rod 29. In the particular construction illustrated, the threaded rod 29 and shaft 33 have approximately the same outer diameter. The disc 31 has an outer diameter that is considerably larger than the outer diameters of the threaded rod and the shaft. The shaft 33 has a free end 34. Manually turning the disc 31 causes the adjuster to move in the directions of arrows 36 along the stand longitudinal axis 8.

The adjustable support 1 further comprises a carrier 35. According to one aspect of the invention, the carrier 35 comprises a flat plate 37 and a pipe 39 joined to the plate. The pipe 39 is sized to fit rather loosely over the adjuster shaft 33. The pipe is preferably shorter than the adjuster shaft, such that the carrier plate rests on the adjuster shaft free end 34 when the carrier is on the adjuster shaft.

FIG. 3 shows the adjustable support 1 in typical use to aid installation of a cabinet 41 above a floor 43. For that application, both the lower post 5 and the upper post 7 are approximately 36 inches long. In addition, the cross holes 30A–30E are spaced apart from each other at 3 inch intervals. The cross hole 30F is spaced 6 inches from the cross hole 30E. The carrier pipe 39 is placed over the adjuster shaft 33. The stand base 3 is placed on the floor 43 at a location that is under the final installed location of the cabinet 41. The lock 11 is unlocked by turning the hand knob 19, and the upper post 7 is slid inside the lower post 5 until the carrier plate 37 is roughly at the height of the final installed locations of the bottom 44 of the cabinet. For a standard cabinet, the pin 32 is inserted through the cross hole 30F in the upper post. The upper post is slid into the lower post until the pin rests on the lower post top end. Then the hand knob 19 is turned to tightly lock the two posts together. The adjuster disc 31 is turned such that the carrier plate 37 is close to the location of where the bottom of the cabinet will be when the cabinet is installed. One or more drill bits and cabinet mounting screws 45 are placed in the tray 21. A conventional electric drill 47 with a bit 49 in its chuck 50 is supported on the tray by inserting the bit 49 through the tray hole 25.

The cabinet 41 is lifted and placed on the adjustable support plate 37. The adjuster disc 31 is turned to raise or lower the cabinet to its final location. Because of the small area of the adjuster shaft free end 34, only a small rotational torque is produced between it and the carrier plate 37. Consequently, the carrier and cabinet have but minimal tendency to turn about the stand longitudinal axis 8 as the adjuster disc 31 is turned.

When the cabinet 41 is at its final location, the carpenter easily maintains it in place with one hand. When he is ready, the carpenter grips the drill 47 and removes its bit 49 from the tray hole 25. He performs the necessary drilling operations on the cabinet without worrying that it will shift location. The screws 45 for mounting the cabinet are conveniently at hand in the tray 21. After the cabinet is fully installed, the adjuster disc 31 is turned to lower the carrier plate 37 away from the bottom of the cabinet, and the adjustable support 1 is ready for use with another cabinet.

It will be appreciated that the adjustable support 1 can be made with different length posts 5 and 7 to suit different requirements. As mentioned, one model may have relatively long posts, such as approximately 36 inches, to suit cabinet installation directly over the floor 43. The present invention also includes a stand 2 having relatively short posts, such as approximately 12 inches, to suit installation of a cabinet over a countertop or similar horizontal shelf under the cabinet and at a distance above the floor.

Further in accordance with the present invention, a modified adjustable support 51, FIGS. 4–6, is useful for installing handrails 52 on a building wall 55 along a stairway 53. The adjustable support 51 has a stand 56 with a base 57, lower post 59, upper post 61, and lock 65. The two posts 59 and 61 define a longitudinal axis 66. The upper post includes a threaded insert 67 that mates with a threaded rod 70 of an adjuster 63. The stand 56 and adjuster 63 may be generally similar to the stand 2 and adjuster 28, respectively, described previously in connection with the adjustable support 1 of FIGS. 1–3. However, a shorter length for the upper post 61 is normally used. The upper post 61 need not have any cross holes analogous to the cross holes 30A–30F in the upper post 7 of the stand 2.

The adjustable support 51 further comprises a carrier 68 that has a pivotable cradle 73. The particular carrier 68 illustrated has a short pipe 69 that fits over the shaft 70 of the adjuster 63. A cross tube 71 is welded or otherwise secured to the pipe 69 across the top end thereof. The cradle 73 includes a trough 74 and two lugs 75 welded to the trough. The trough 74 has an apex 76 that lies in a vertical plane that contains the stand longitudinal axis 66. The lugs 75 straddle the cross tube 71. A T-nut 77 is welded to one of the lugs. A stud 81 with a knob 79 on one end passes through the lugs and the cross tube 71 and engages the T-nut 77. By loosening the hand knob 79, the cradle can pivot in the directions of arrows 82 about a centerline 84 that is substantially perpendicular to the stand longitudinal axis 66. Tightening the hand knob 79 clamps the cradle at the desired angle relative to the stand longitudinal axis.

Looking especially at FIG. 6, various regulatory agency rules specify that the handrail 52 must be at a prescribed spacing X from the stairway wall 55. To automatically locate the trough 74 on the adjustable support stand 56 at the proper spacing X, the base 57 has a working edge 83 that is at a distance D from the stand longitudinal axis 66. The distance D takes into account the thickness of a toe plate 85 that is a normal component of stairway construction. When the base working edge 83 is placed flush against the toe plate 85, the carrier trough is inherently at the proper spacing X from the wall. For instance, if the spacing X is specified to be 1.50 inches, the handrail has a diameter of 2.00 inches, and the toe plate thickness is 0.75 inches, then the distance D is 1.75 inches.

When the stand base 57 is against the toe plate 85, the upper post 61 is locked at approximately the correct location relative to the final installed location of the handrail 52. The carrier cradle 73 is pivoted to the proper angle for the handrail and clamped by means of the hand knob 79. The handrail is placed in the cradle, and the adjuster 63 is turned to bring the handrail to the exact desired location. The handrail stays in place while the carpenter installs it to the wall 55.

Figure 8:
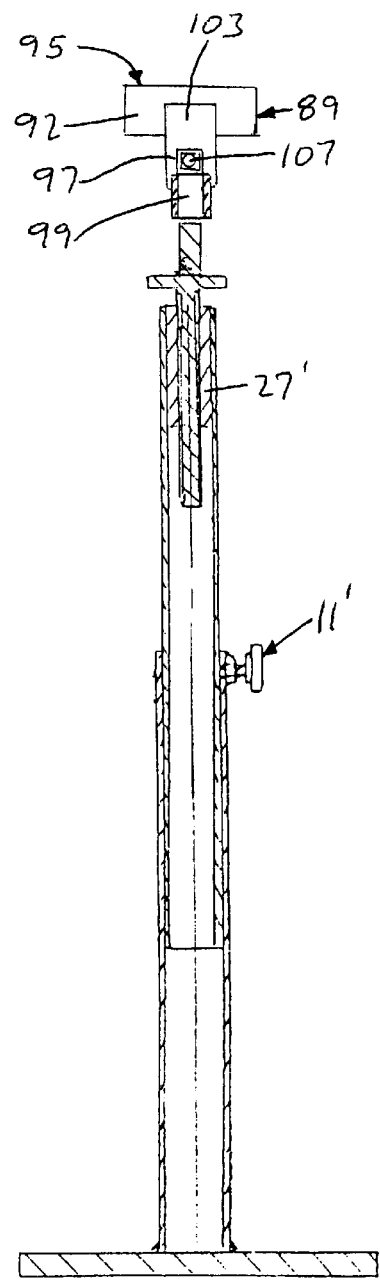
FIG. 8 is a cross-sectional view taken along line 8—8 of FIG. 7.

In FIGS. 7 and 8, an adjustable support 87 is used to install handrails. The adjustable support 87 uses a base 3' that is the same as the base 3 of the adjustable support 1 of FIGS. 1–3. The adjustable support 87 also has posts 5' and 7' that define a longitudinal axis 8', a threaded insert 27', and a lock 11' may be generally similar to the corresponding components of the adjustable support 1, although the upper post 7' may be shorter than the upper post 7. The adjustable support 87 further comprises a carrier 95 with a cradle 89. The cradle 89 includes a trough 92 similar to the trough 74 of the adjustable support 51 of FIGS. 4–6 described above.

It is an important feature of the adjustable support 87 that the carrier trough 92 is automatically located at the proper spacing from a stairway wall despite the use of the stand base 3'. The proper spacing is achieved by offsetting the trough 92 of the cradle 89 a distance Y from the stand longitudinal axis 8'. The particular distance Y is dependent on the dimensions of the base 3'. In one embodiment, the base 3' has a distance of 6.00 inches from the longitudinal axis 8' to a working edge 94. For a toe plate thickness of 0.75 inches, a handrail spacing of 1.50 inches from the stairway wall, and a handrail diameter of 2.00 inches, the offset Y is 4.25 inches. To obtain that offset, the carrier 95 has a cross tube 97 that overhangs a pipe 99. A spacer tube 101 fits between two lugs 103 that are welded or otherwise joined to the trough 92. A long stud 107 passes through the lugs 103, cross tube 97, and spacer tube 101. One end of the stud 107 engages a T-nut 109 on one of the lugs 103. There is a knob 111 on the other end of the stud. Tightening and loosening the knob 111 enables the cradle 89 to be pivoted and clamped at the proper angle for the handrail.

In summary, the results and advantages of cabinets and handrails in homes and other buildings can now be more fully realized. The adjustable support of the invention provides both support of a cabinet 41 or handrail 52 during installation, as well as adjustability to suit different heights of the cabinets above a floor, and the height and angle of the handrail relative to a stairway 53. This desirable result comes from using the combined functions of the adjuster and the cradle. The upper and lower posts combine with the pin 32 to approximately locate the carrier relative to the final installed location of the cabinet or handrail. Turning the adjuster brings the carrier to the final location. The adjustable support is strong and stable enough to hold the cabinet or handrail in place while the carpenter uses one hand to perform the drilling and other tasks required for the installation process. The tray 21 stores the electric drill 47 and mounting screws close at hand for convenient access when needed. The modified base 57 enables proper spacing of the cradle trough 72 on the carrier 68 without having to measure the spacing X between the handrail and the building wall 55. The offset carrier 95 enables the same base to be used for both cabinet and handrail installation. The same adjuster can be used for the carriers 35, 68, and 95.

It will also be recognized that in addition to the superior performance of the adjustable support of the invention, its cost is very small in relation to the benefits it provides. In fact, its initial cost is quickly recovered through increased productivity in the cabinet and handrail installation processes.

Thus, it is apparent that there has been provided, in accordance with the invention, an adjustable support that satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:
1. An adjustable support comprising:
   a. a stand that defines a longitudinal axis;
   b. an adjuster comprising:
      i. a threaded rod that mates with the stand;
      ii. an unthreaded shaft having a free end; and
      iii. a disc integral with and located between the threaded rod and the shaft;
   c. an unthreaded carrier removably fit over and resting on and turntable relative to the adjuster shaft free end; and
   d. a tray immovably secured to the stand for storing selected tools associated with the selected object,
   so that the adjuster, carrier, and a selected object placed on the he carrier are moveable along the stand longitudinal axis in response to turning the adjuster disc without turning the carrier or the object.

2. An adjustable support comprising:
   a. a stand that defines a longitudinal axis wherein the stand comprises:
      i. a base;
      ii. a lower post upstanding from the base;
      iii. an upper post slideable within the lower post;
      iv. means for locking the upper and lower posts relative to each other comprising:
         a nut on the lower post; and
         a hand lock having a stud that mates with the nut, and a hand knob, the stud passing through a hole in the lower post and contactable with the upper post such that selectively turning the hand knob locks the upper and lower posts to each other and unlocks the posts from each other; and
      v. a tray immovably secured to the lower post for storing selected tools associated with the selected object;
   b. an adjuster comprising:
      i. a threaded rod that mates with the stand;
      ii. an unthreaded shaft having a free end; and
      iii. a disc integral with and located between the threaded rod and the shaft; and
   c. an unthreaded carrier removably fit over and resting on and turntable relative to the adjuster shaft free end,
   so that the adjuster, carrier, and a selected object placed on the carrier are moveable along the stand longitudinal axis in response to turning the adjuster disc without turning the carrier or the object.

3. An adjustable support comprising:
   a. a stand that defines a longitudinal axis;
   b. an adjuster comprising:
      i. a threaded rod that mates with the stand;
      ii. an unthreaded shaft having a free end; and
      iii. a disc integral with and located between the threaded rod and the shaft;
   c. an unthreaded carrier removably fit over and resting on and turntable relative to the adjuster shaft free end; and
   d. a tray immovably secured to the stand for storing selected tools associated with the selected object, wherein the tray is made with first and second legs that are substantially perpendicular to each other, and wherein at least one of the first and second legs defines at least one hole therethrough that is sized and located to hold a bit chucked in an electric drill,
   so that the adjuster, carrier, and a selected object placed on the carrier are moveable along the stand longitudinal axis in response to turning the adjuster disc without turning the carrier or the object, and so that the electric drill is storable on the tray.

4. An adjustable support comprising:
   a. a stand that defines a longitudinal axis;
   b. an adjuster comprising:
      i. a threaded rod that mates with the stand;
      ii. an unthreaded shaft having a free end; and
      iii. a disc integral with and located between the threaded rod and the shaft; and
   c. an unthreaded carrier removably fit over and resting on and turntable relative to the adjuster shaft free end, wherein the carrier comprises:
      i. a pipe that removeably fits over the adjuster shaft;
      ii. a cross tube fixed to the pipe and resting on the adjuster shaft free end; and
      iii. a cradle pivotable on the cross tube about a centerline that is perpendicular to the stand longitudinal axis, the cradle supporting a selected object in place at a selected angle relative to the stand longitudinal axis,
   so that the adjuster, carrier, and a selected object placed on the carrier are moveable along the stand longitudinal axis in response to turning the adjuster disc without turning the carrier or the object.

5. An adjustable support comprising:
   a. a stand that defines a longitudinal axis;
   b. an adjuster comprising:
      i. a threaded rod that mates with the stand;
      ii. a shaft having a free end; and
      iii. a disc between the threaded rod and the shaft; and
   c. a carrier removably fit over and resting on the adjuster shaft free end, wherein the carrier comprises:
      i. a pipe that removably fits over the adjuster shaft;
      ii. a cross tube fixed to the pipe and resting on the adjuster shaft free end; and
      iii. a cradle pivotable on the cross tube about a centerline that is perpendicular to the stand longitudinal axis, the cradle supporting a selected object in place at a selected angle relative to the stand longitudinal axis, wherein the cradle comprises
      a trough having an apex that defines a plane parallel to the stand longitudinal axis, wherein the plane defined by the carrier trough apex is offset by a predetermined distance from the stand longitudinal axis;
      a pair of lugs joined to the trough; and
      means for clamping the lugs to the cross tube at the selected angle of the trough relative to the stand longitudinal axis.

6. The adjustable support of claim 5 wherein:
   a. the stand comprises a base with a working edge that is at a predetermined distance from the stand longitudinal axis; and
   b. the base working edge is placeable against a selected stationary member and locates the trough apex at a predetermined spacing from the selected stationary member,
      so that an object supported on the trough is at the predetermined spacing from the selected stationary member.

7. Apparatus that aids in installing a selected object to a stationary member above a horizontal surface comprising:
   a. a stand placed on a horizontal surface and defining a longitudinal axis;
   b. a carrier that supports a selected object; and c. an adjuster comprising:
  i. a threaded rod mating with the stand;
  ii. a shaft having a free end on which the carrier rests, the carrier being turnable on and removeable from the adjuster shaft; and
  iii. a disc between the threaded rod and the shaft, the carrier and the selected object moving along the stand longitudinal axis in response to turning the disc without turning the carrier or the selected object relative to the stand longitudinal axis, wherein:
    the carrier comprises:
      a pipe that removeably fits over the adjuster shaft;
      a cross tube secured to the pipe and resting on the adjuster shaft free end; and
      a cradle pivotable on the cross tube about a centerline generally perpendicular to the stand longitudinal axis to a selected angle relative to the stand longitudinal axis; and
    the selected object is a hand rail supported on the carrier cradle.

8. Apparatus that aids in installing a selected object to a stationary member above a horizontal surface comprising:
a. a stand placed on a horizontal surface and defining a longitudinal axis;
b. a carrier that supports a selected object, wherein:
  i. the carrier comprises:
    a pipe that removably fits over the adjuster shaft;
    a cross tube secured to the pipe and resting on the adjuster end free end; and
    a cradle pivotably on the cross tube about a centerline generally perpendicular to the stand longitudinal axis to a selected angle relative to the stand longitudinal axis, wherein the cradle comprises a trough with an apex that defines a plane parallel to the stand longitudinal axis, and means for clamping the trough to the cross tube at the selected angle relative to the stand longitudinal axis, wherein the plane defined by the trough apex is offset a predetermined distance from the stand longitudinal axis; and
  ii. the selected object is a handrail supported on the carrier cradle; and
c. an adjuster comprising:
  i. a threaded rod mating with the stand;
  ii. a shaft having a free end on which the carrier rests; and
  iii. a disc between the threaded rod and the shaft, the carrier and the selected object moving along the stand longitudinal axis in response to turning the disc without turning the carrier or the selected object relative to the stand longitudinal axis.

9. Apparatus that aids in installing a selected object to a stationary member above a horizontal surface comprising:
a. a stand placed on a horizontal surface and defining a longitudinal axis, wherein the stand has a base with a working edge that is at a first predetermined distance from a stand longitudinal axis;
b. a carrier that supports a selected object, wherein:
  i. the carrier comprises: a pipe that removably fits over the adjuster shaft;
    a cross tube secured to the pipe and resting on the adjuster shaft free end; and
    a cradle pivotable on the cross tube about a centerline generally perpendicular to the stand longitudinal axis to a selected angle relative to the stand longitudinal axis, wherein the cradle comprises a trough with an apex that defines a plane parallel to the stand longitudinal axis, and means for clamping the trough to the cross tube at the selected angle relative to the stand longitudinal axis, wherein the plane defined by the trough apex is offset from the stand longitudinal axis a second predetermined distance less than the first predetermined distance; and
  ii. the selected object is a handrail supported on the carrier cradle, wherein the stand base working edge is placeable against a stairway associated with a wall to which the handrail is installed and thereby locates the handrail at a predetermined spacing from the wall; and
c. an adjuster comprising:
  i. a threaded rod mating with the stand;
  ii. a shaft having a free end on which the carrier rests; and
  iii. a disc between the threaded rod and the shaft, the carrier and the selected object moving along the stand longitude axis in response to turning the disc without turning the carrier or the selected object relative to the stand longitudinal axis.

10. Apparatus that aids in installing a selected object to a stationary member above a horizontal surface comprising:
a. a stand placed on a horizontal surface and defining a longitudinal axis;
b. a carrier that supports a selected object; and
c. an adjuster comprising:
  i. a threaded rod mating with the stand;
  ii. a shaft having a free end on which the carrier rests, the carrier being turnable on and removeable from the adjuster shaft; and
  iii. a disc between the threaded rod and the shaft, the carrier and the selected object moving along the stand longitudinal axis in response to turning the disc without turning the carrier or the selected object relative to the stand longitudinal axis, wherein:
    the carrier comprises:
      a pipe that removeably fits over the adjuster shaft; and
      a plate joined to the pipe, the plate resting on the adjuster shaft free end; and
    the selected object is a cabinet that is supported on the carrier plate,
    wherein the stand comprises:
      a base;
      a first post upstanding from the base and having a top end;
      a second post slidable inside the first post and having a threaded insert that mates with the adjuster threaded rod, the second post defining at least one cross hole therethrough; and
      a pin removeably insertedable through said at least one cross hole in the second post and resting on the top end of the first post and cooperating therewith to locate the carrier at a nominal distance of approximately 54 inches from the base,
    so that the cabinet is at a nominal standard height above the base prior to the turning the adjuster disc.

11. The apparatus of claim 10 wherein the second post has a plurality of cross holes therethrough spaced at 3 inch intervals,
so that the pin can be inserted through selected cross holes to locate the cabinet at corresponding selected standard heights of the cabinet above the base.

12. A method of installing a handrail to wall along a stairway comprising the steps of:
   a. placing a stand that defines a longitudinal axis on stairway proximate a stairway toeplate of a wall comprising the steps of:
      i. providing a stand with a working edge at a predetermined first distance from the stand longitudinal axis; and
      ii. placing the stand working edge against the stairway toeplate;
   b. threading a first end of an adjuster into the stand;
   c. rusting a carrier on a second end of the adjuster without tilting thereon;
   d. pivoting a cradle on the carrier to a selected angle relative to the stand longitudinal axis comprising the step of providing a cradle with an apex that defines a plane that contains the stand longitudinal axis; and
   e. supporting a handrail on the cradle, and installing the handrail to the wall,
   so that the handrail is at a spacing from the wall a distance determined by the distance of the stand working edge from the longitudinal axis.

13. A method of installing a handrail to a wall along a stairway comprising the steps of:
   a. placing a stand that defines a longitudinal axis on a stairway proximate a wall comprising the steps of:
      i. providing a stand with a working edge at a first predetermined distance from the longitudinal axis; and
      ii. placing the stand working edge against the stairway;
   b. threading a first end of an adjuster into the stand;
   c. resting a carrier on a second end of the adjuster;
   d. pivoting a cradle on the carrier to a selected angle relative to the stand longitudinal axis comprising the step of providing a cradle with an apex that defines a plane that is parallel to the stand longitudinal axis and is at a second predetermined distance from the stand longitudinal axis; and
   e. supporting a handrail on the cradle, and installing the handrail to the wall,
   so that the handrail supported on the cradle is at a distance from the wall determined by the first predetermined distance between the stand working edge and the longitudinal axis and by the second predetermined distance between the stand longitudinal axis and the plane defined by the cradle apex.

* * * * *